Oct. 21, 1924.

M. U. RAMSAY ET AL 1,512,798

WORM HOB FOR GEAR CUTTING

Filed April 18, 1922

Inventors
M. U. Ramsay
D. M. Moeglen
By Marks Clerk
Attys.

Patented Oct. 21, 1924.

1,512,798

UNITED STATES PATENT OFFICE.

MARCEL ULYSSE RAMSAY AND DÉSIRÉ MARIE MOEGLEN, OF BOIS-COLOMBES, FRANCE.

WORM HOB FOR GEAR CUTTING.

Application filed April 18, 1922. Serial No. 555,292.

*To all whom it may concern:*

Be it known that we, MARCEL ULYSSE RAMSAY and DÉSIRÉ MARIE MOEGLEN, respectively citizens of the Swiss Republic and of the French Republic, residing at Bois-Colombes, Seine, in the Republic of France, have invented new and useful Improvements in Worm Hobs for Gear Cutting, of which the following is a specification.

The present invention has for its object a worm hob for the cutting of gears which is especially noteworthy in that it comprises two sets of helical grooves inclined in opposite directions with reference to the helix of the worm hob thread, the intersection of these helical grooves with the sides of the threads of the worm hob determining the cutting edges of the tool, so that the teeth succeeding each other on the thread of the worm hob will work alternately to the right and left whereby the cutting and the disengagement of the chip are facilitated.

In the accompanying drawing given by way of example:

Figure 1:
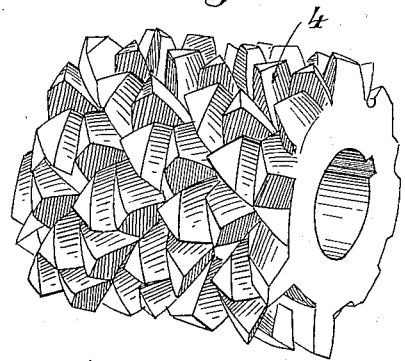
Fig. 1 shows in perspective a worm hob for gear cutting constructed according to this invention.
Figure 2:
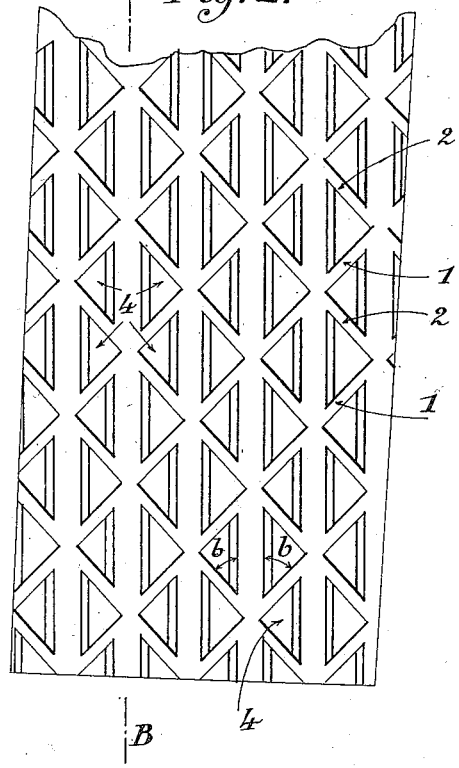
Fig. 2 is a development of its lateral surface.

The worm hob forming the object of this invention (Figs. 1 and 2) comprises two sets of helical grooves 1 and 2 inclined in opposite directions with reference to the helix A—B of the screw. The intersection of these helical grooves with the side faces of the threads of the worm hob determines the cutting edges of the tool shown in heavy lines in Fig. 2. The cutting angle $b$ may be chosen at such a value as to obtain the best working of the tool.

The examination of this figure shows that the teeth 4 which succeed each other on the thread of the worm hob operate alternately to the right and left which facilitates the cutting and the disengagement of the chip.

Having now described our invention, what we claim as new and desire to secure by Letters Patent is:

A worm hob for cutting gear teeth comprising a worm thread and two sets of helical grooves of opposite senses and greater pitch than the worm, the cutting edges being constituted by the intersection of the side faces of the said worm thread with said helical grooves, whereby the teeth succeeding each other on the worm thread will work alternately to the right and the left.

In testimony whereof we have signed our names to this specification.

MARCEL ULYSSE RAMSAY.
DÉSIRÉ MARIE MOEGLEN.